(No Model.)
F. JOSETT.
TOOL FOR CUTTING TAPERING OR IRREGULARLY SHAPED HOLES.
No. 389,389. Patented Sept. 11, 1888.
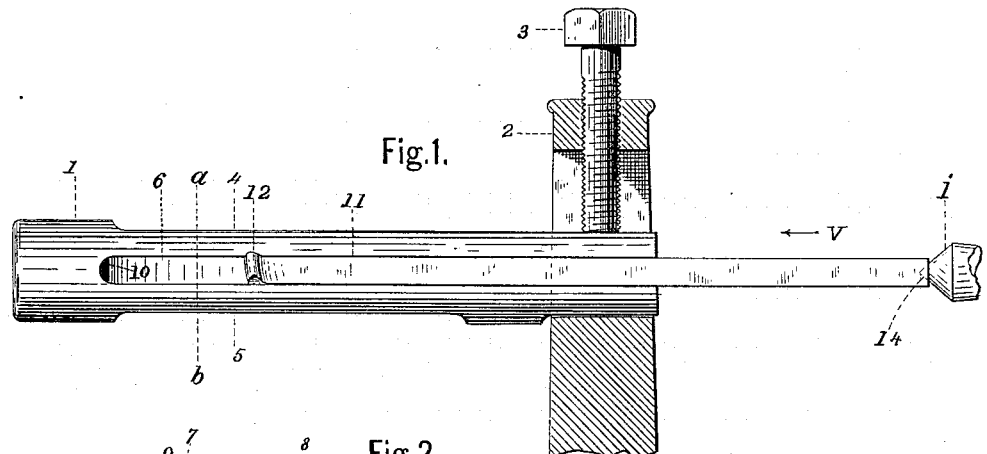
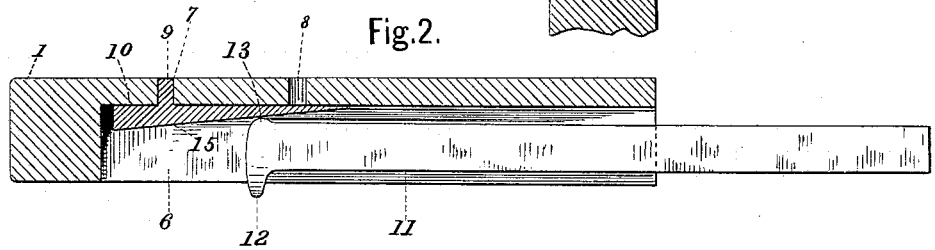
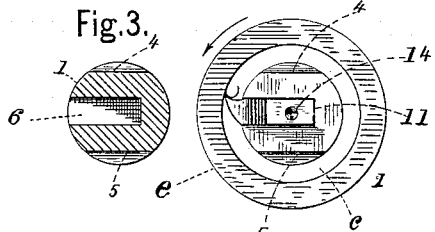
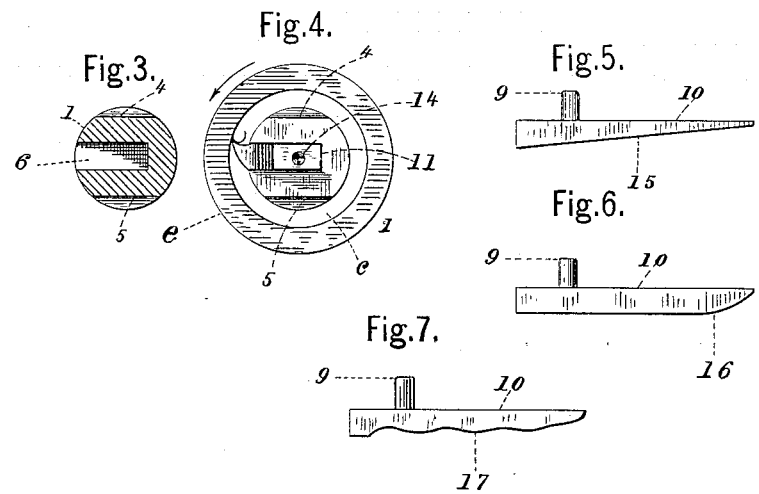
Witnesses.
Charles Schenk
Harriet Johnson
Frank Josett, Inventor.
By James Sangster,
Attorney.

UNITED STATES PATENT OFFICE.

FRANK JOSETT, OF LIMA, OHIO.

TOOL FOR CUTTING TAPERING OR IRREGULARLY-SHAPED HOLES.

SPECIFICATION forming part of Letters Patent No. 389,389, dated September 11, 1888.

Application filed March 1, 1888. Serial No. 265,872. (No model.)

*To all whom it may concern:*

Be it known that I, FRANK JOSETT, a citizen of the United States, residing in Lima, in the county of Allen and State of Ohio, have invented certain new and useful Improvements in Tools for Cutting Tapering or Irregularly-Shaped Holes, of which the following is a specification.

My invention relates to certain improvements in tools for boring or cutting tapering or irregular-shaped holes, and will be fully and clearly hereinafter described and claimed, reference being had to the accompanying drawings, in which—

Figure 1 is a front elevation of the device, showing it connected to the tool-post of a lathe, the tool-post being in section, so as to show the parts more clearly. Fig. 2 is a sectional elevation showing a longitudinal central section through the slotted guide-piece and one of the cutter-guiding pieces, and also a side elevation of a suitable cutter in position. Fig. 3 is a cross-section through line *a b*, Fig. 1. Fig. 4 is an end view looking in the direction of the arrow *v*, Fig. 1, showing also a portion of a piece of tubing in which a hole is being cut. Fig. 5 is a side elevation of one of the cutter-guiding pieces for cutting a tapering hole. Fig. 6 is a side elevation of a cutter-guiding piece for cutting a hole having one end curved and contracted. Fig. 7 represents a side elevation of still another form of cutter-guiding piece for cutting a hole having an irregular or waveline shape.

This invention is designed for boring a hole either of any tapering form or of any desired irregular shape by means of a bar, 1, of any suitable form, adapted to be secured to the tool-post of a lathe and secured in the desired position to the tool-post 2 by a set-screw, 3, (see Fig. 1;) but a bar having a flat top and bottom side, 4 and 5, is preferred, because it is of a more suitable form for the tool-post. This bar 1 is provided with a longitudinal central slot, 6, made, preferably, of an oblong form in cross-section and having straight plane sides and bottom and sufficiently deep to receive and hold the tool for cutting; but any other form of slot 6 adapted to receive the cutter and prevent it from turning may be used.

In the bottom of the slot 6 are two holes, 7 and 8, adapted to receive the pin 9, projecting from the backs of the removable cutter-guiding pieces 10. These cutter-guiding pieces 10 are adapted to fit nicely in the slot 6, and are kept in position by the pin 9, which slips into either of the holes, 7 or 8, according to the position in which it is desired to place the guide-piece.

The cutting-tool 11 is a flat bar of steel adapted to fit in the slot 6, so as to be easily moved longitudinally within it. It is provided with a cutting-point, 12, and a rounded or smooth heel, 13, (shown in Fig. 2,) and at its rear end is a hole or tapering depression, 14, adapted to receive the back center, *i*, of the lathe with which it is connected.

The faces of the cutter-guiding pieces 10 are of any form it is desired to bore the hole. In Figs. 2 and 5 I have shown a plane inclined face, 15, for boring taper holes. In Fig. 6 the face is formed with a single curve, 16, for boring a different-shaped hole, and in Fig. 7 is shown an irregular wave-line face, 17. These guide-pieces are interchangeable, so that any shaped hole may be bored with the same tool by simply changing the guide-pieces 10. When the shape of the hole is such that it could not all be bored with one cut, a series of guiding-pieces may be used, so that as many cuts as may be necessary can be taken to complete the boring of the hole.

In using this device, it is secured in the tool-post 2, (see Fig. 1,) and is then moved along the lathe until it projects sufficiently into the hole to be turned out. The cutting-tool is then put in place and secured at the end by the back center of the lathe, as shown in Fig. 1, the heel of the cutter resting against the face of the guiding-piece, as shown in Fig. 2, while its cutting-edge 12 rests against the side of the hole to be cut, (the hole *c* in the piece *e*, shown in Fig. 4, for instance,) the piece *e* being secured to the head of a lathe, either by a chuck or in any other well-known way, to the face piece of a lathe, so that the cutter-bar 11, as it is moved longitudinally in the slot, has its cutting-edge 12 forced out at an angle to the longitudinal movement corresponding with the shape of the removable cutter-guiding piece.

The operation of the invention will be fully and easily understood from the foregoing description and accompanying drawings.

I claim as my invention—

In a tool for cutting tapering or irregular-shaped holes, the combination of a longitudinally-slotted bar adapted to be held rigid in the tool-post of a lathe, a removable cutter-guiding piece held immovably in said slot by a pin and having a face conforming to the shape of the hole to be cut for guiding the cutter, a cutter adapted to fit the slot having a cutting-edge at the forward end projecting laterally therefrom and opposite to the cutting-edge, a heel to bear against the cutter-guiding piece, and at its rear end a depression to receive the back center of the lathe for operating it, substantially as described.

FRANK JOSETT.

Witnesses:
H. H. GILSON,
M. J. BECKER.